United States Patent
Racchella et al.

(10) Patent No.: US 10,421,504 B2
(45) Date of Patent: Sep. 24, 2019

(54) AGRICULTURAL VEHICLE HAVING A PIVOTABLE CAB

(71) Applicant: AGCO International GmbH, Neuhausen (CH)

(72) Inventors: Fabio Racchella, Breganze (IT); Paolo Basso, Breganze (IT)

(73) Assignee: AGCO International GmbH, Neuhausen (CH)

(*) Notice: Subject to any disclaimer, the term of this patent is extended or adjusted under 35 U.S.C. 154(b) by 0 days.

(21) Appl. No.: 15/953,545

(22) Filed: Apr. 16, 2018

(65) Prior Publication Data

US 2018/0312202 A1 Nov. 1, 2018

(30) Foreign Application Priority Data

Apr. 26, 2017 (GB) .................................. 1706601.0

(51) Int. Cl.
| | | |
|---|---|---|
| *B62D 33/067* | (2006.01) | |
| *B62D 33/06* | (2006.01) | |
| *A01B 76/00* | (2006.01) | |
| *B62D 33/073* | (2006.01) | |
| *A01B 59/00* | (2006.01) | |
| *A01D 41/12* | (2006.01) | |

(52) U.S. Cl.
CPC .......... *B62D 33/067* (2013.01); *A01B 76/00* (2013.01); *B62D 33/0608* (2013.01); *B62D 33/0617* (2013.01); *B62D 33/073* (2013.01); *A01B 59/00* (2013.01); *A01D 41/12* (2013.01); *B60Y 2200/22* (2013.01); *B60Y 2400/406* (2013.01)

(58) Field of Classification Search
CPC ............................ B62D 33/067; B62D 33/073
USPC ......................................... 296/190.05, 190.06
See application file for complete search history.

(56) References Cited

U.S. PATENT DOCUMENTS

| | | | | |
|---|---|---|---|---|
| 4,440,437 A | * | 4/1984 | Hahm ................. | B62D 33/067 180/89.13 |
| 5,488,817 A | * | 2/1996 | Paquet ................ | A01D 41/127 56/10.2 R |
| 10,058,029 B2 | * | 8/2018 | Bischoff ............ | A01D 41/1273 |
| 2005/0264038 A1 | | 12/2005 | Albright | |
| 2009/0118913 A1 | * | 5/2009 | O'Halloran ........ | B60G 17/0165 701/50 |
| 2010/0264694 A1 | * | 10/2010 | Crawford ............ | B62D 33/067 296/190.05 |
| 2010/0301635 A1 | * | 12/2010 | Andou ................. | B62D 33/067 296/190.05 |

(Continued)

FOREIGN PATENT DOCUMENTS

| | | |
|---|---|---|
| DE | 102004020435 A1 | 9/2004 |
| EP | 0705787 A1 | 4/1996 |

(Continued)

OTHER PUBLICATIONS

UK Intellectual Property Office, International Search Report for Priority Application No. GB1706601.0, dated Sep. 25, 2017.

*Primary Examiner* — Jason S Morrow

(57) ABSTRACT

An agricultural machine, preferably a combine harvester, which has a pivoting vehicle cab. The cab is pivotable relative to the main frame of the machine, about an axis of rotation transverse to the direction of travel of the machine. The cab is pivoted to allow an operator to view a front coupling of the machine, to observe the attaching or detaching of a work implement to the front coupling.

20 Claims, 2 Drawing Sheets

(56) References Cited

U.S. PATENT DOCUMENTS

| | | | |
|---|---|---|---|
| 2013/0221704 A1* | 8/2013 | Kim | B60N 2/143 296/190.04 |
| 2013/0305677 A1* | 11/2013 | Patterson | A01D 75/002 56/14.5 |
| 2014/0319251 A1* | 10/2014 | Pollklas | A01F 29/14 241/33 |

FOREIGN PATENT DOCUMENTS

| | | |
|---|---|---|
| JP | H07-285792 | 10/1995 |
| JP | 2003336288 A2 | 11/2003 |

\* cited by examiner

AGRICULTURAL VEHICLE HAVING A PIVOTABLE CAB

FIELD OF THE INVENTION

The present invention relates to an agricultural vehicle having a pivotable cab, preferably an agricultural harvester machine.

BACKGROUND OF THE INVENTION

Agricultural machines such as harvesters, combines, windrowers, agricultural tractors, etc., are provided with vehicle cabs to house vehicle operators. Such cabs are usually provided with dedicated cab suspension systems, to minimise the effects of vibrations due to travel over uneven surfaces or at relatively high speeds over roads. The use of such dedicated suspension systems leads to increased cost and manufacturing complexity for such agricultural machines.

In addition, many agricultural machines are provided with work implements which can be selectably attached to the machine for performing various agricultural operations, e.g. different types of headers for a combine harvester. When attaching such implements to the agricultural machine, an operator normally has to strain to get a good view of the attachment from the cab, or else will rely on expensive camera systems or the assistance of a co-worker to ensure that the attachment is correctly executed.

It is an object of the invention to provide an agricultural vehicle which addresses the above issues.

SUMMARY OF THE INVENTION

Accordingly, there is provided an agricultural machine, the machine comprising:
a main frame;
a front coupling provided on the main frame for releasably attaching a work implement to the agricultural machine; and
a vehicle cab for housing an operator,
wherein the vehicle cab is mounted to the main frame via at least one hinge coupling, the hinge coupling having an axis of rotation transverse to the direction of travel of the agricultural machine such that, in use, the vehicle cab is pivotable about the axis of rotation relative to the main frame, to provide an operator with a view of the front coupling and/or a work implement attached thereto.

By providing the vehicle cab on a hinged coupling, the operator can adjust the pivoting of the cab to provide for a clear view of the front coupling of the machine. As a result, an operator can easily and comfortably observe the attaching/detaching of an implement with the front coupling, without the need for an expensive camera monitoring system and/or external assistance.

Preferably, the agricultural machine comprises a harvester, such as a combine harvester or forage harvester. In such embodiments, as the vehicle cab is generally provided towards the front of the machine, accordingly the ability to pivot the cab downwards to monitor the attachment of different headers to the machine provides a considerable advantage to operators. Alternatively, it will be understood that the agricultural machine may comprise any other suitable vehicle, e.g. an agricultural tractor, a windrower.

Preferably, the vehicle cab is mounted to a support frame, wherein the at least one hinge coupling is provided on the support frame.

Providing the cab on a support frame allows for the hinge coupling to be mounted to such a structural frame, thereby ensuring that the cab can be securely supported during a pivoting operation.

Preferably, the agricultural machine comprises at least one actuator arranged to control the pivoting of the vehicle cab about the axis of rotation.

Preferably, a first end of the at least one actuator is coupled with the main frame, a second end of the at least one actuator coupled with the support frame.

The support frame provides an anchor location for the controlling of the pivoting of the cab, based on the operation of the actuator.

Preferably, the at least one actuator comprises a linear actuator, preferably a hydraulic cylinder.

The actuator may be hingedly coupled to the main frame and to the support frame, to allow the movement of a first end of the actuator through an arc as the vehicle cab is pivoted.

In a preferred embodiment, the agricultural machine comprises at least one hydraulic accumulator coupled with the at least one hydraulic cylinder, the at least one hydraulic accumulator acting as a damper for the hydraulic cylinder to reduce vibrations of the vehicle cab.

By connecting an accumulator to a hydraulic cylinder, the system provides an effective damping effect on any vibrations experienced by the main frame of the machine, to reduce the impact of such vibrations on the cab itself. As a result, the system functions as a cab suspension system, providing for improved operator comfort. It will be understood that the accumulator may be continually coupled with the hydraulic cylinder, or the accumulator may be selectively coupled with the cylinder when it is desired to provide a vibration damping effect for the vehicle cab.

Preferably, the agricultural machine comprises a controller arranged to selectively couple the at least one hydraulic cylinder with the at least one hydraulic accumulator.

Such a controller can be used to initiate a damping mode of the system, by connecting the accumulator to the hydraulic cylinder.

Preferably, said coupling is responsive to an initiation of a road transport mode of the agricultural machine.

One of the operating situations wherein a damping effect would be desirable is when the machine is traveling on roads at a relatively high speed, when relatively small variations in surface height can translate into relatively large vibrations or oscillations at the vehicle cab. By providing a hydraulic accumulator coupled with a hydraulic cylinder, the damping effect of such a system acts to reduce the effect of any such vibrations at the cab itself.

Preferably, the agricultural machine comprises a controller arranged to control the pivoting of the vehicle cab about the axis of rotation.

Preferably, the pivoting is performed in response to a user command to pivot the vehicle cab. Additionally or alternatively, the pivoting is performed in response to the controller detecting an operation is being performed to attach or detach a work implement with the front coupling.

It will be understood that the controller arranged to control the pivoting and the controller arranged to control the connection of the accumulator to the hydraulic cylinder may be provided as a single controller, or may be provided as separate controllers. The controller may be provided as a dedicated controller device, or may be provided as part of a general purpose electronics control unit (ECU) for the agricultural machine.

The pivoting can be user-initiated, e.g. by a user command provided through an operator terminal, or the controller can be configured to automatically pivot the cab to provide a view of the front coupling when a coupling operation is detected as occurring.

Preferably, the agricultural machine is provided with left and right hinge couplings provided at left- and right-hand sides of the vehicle cab. Preferably, the agricultural machine is provided with left and right actuators provided at left- and right-hand sides of the vehicle cab.

BRIEF DESCRIPTION OF THE DRAWINGS

Embodiments of the invention will now be described, by way of example only, with reference to the accompanying drawings, in which.

It will be understood that the drawings are illustrative of the operation of the invention, and are not provided to scale.

DETAILED DESCRIPTION OF THE INVENTION

Figure 1:
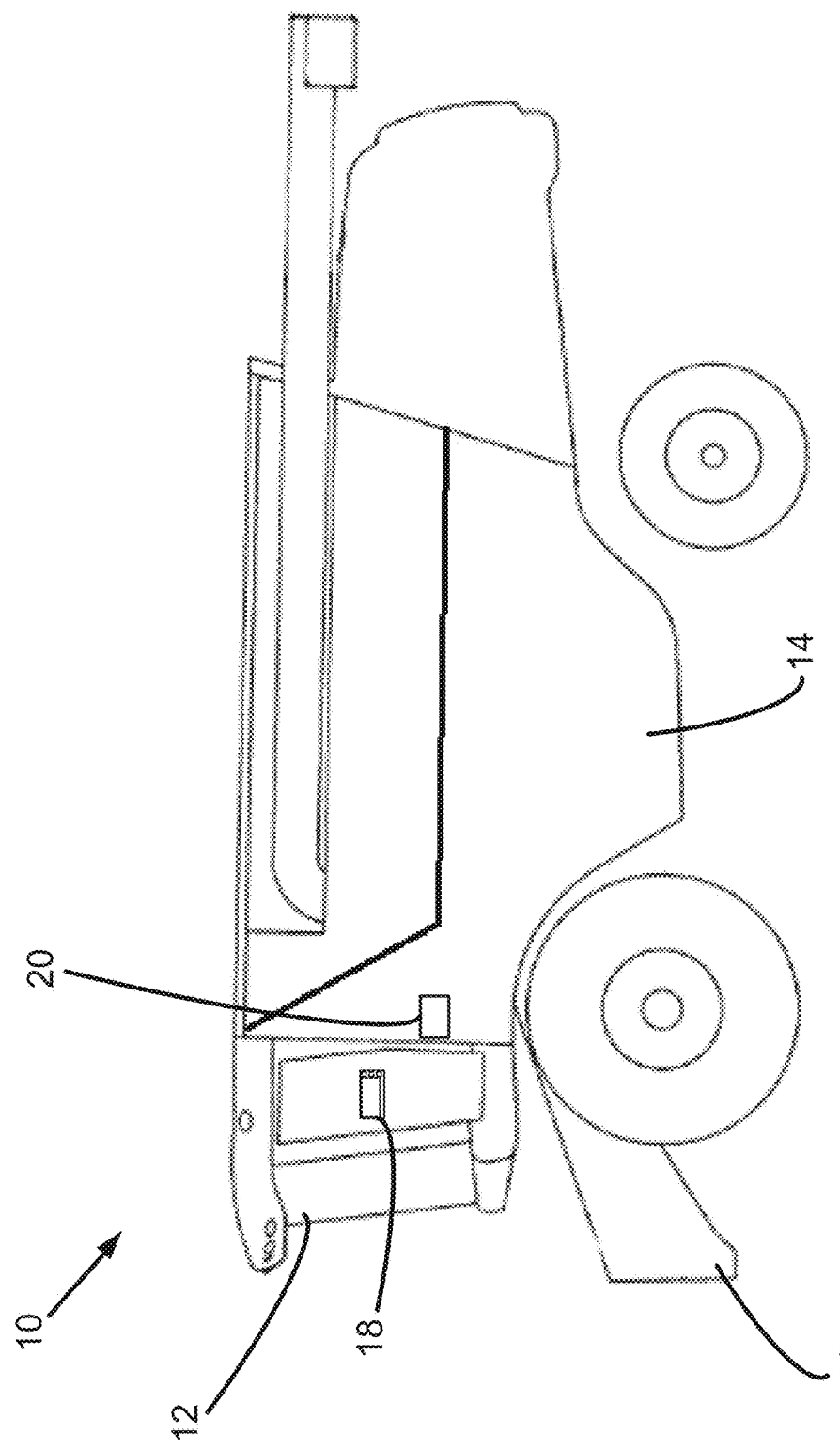
FIG. 1 is an illustration of an agricultural machine according to an embodiment of the invention.

With reference to FIG. 1, an agricultural machine in the form of a combine harvester is indicated at 10. The combine harvester 10 comprises a vehicle cab 12 provided towards the front of the combine 10 and a main body or main frame 14 which houses and supports the remainder of the components of the combine 10. A front coupling 16 is provided at the front of the combine 10, which allows for work implements (not shown) to be selectively attached to the combine 10. Such work implements may comprise different types of combine headers use to perform different types of combine operations.

An operator terminal 18 is provided in the vehicle cab 12 which allows for an operator to input various user commands. The operator terminal 18 is coupled with an electronics control unit (ECU) 20, to control different components and systems of the combine 10.

Figure 2:
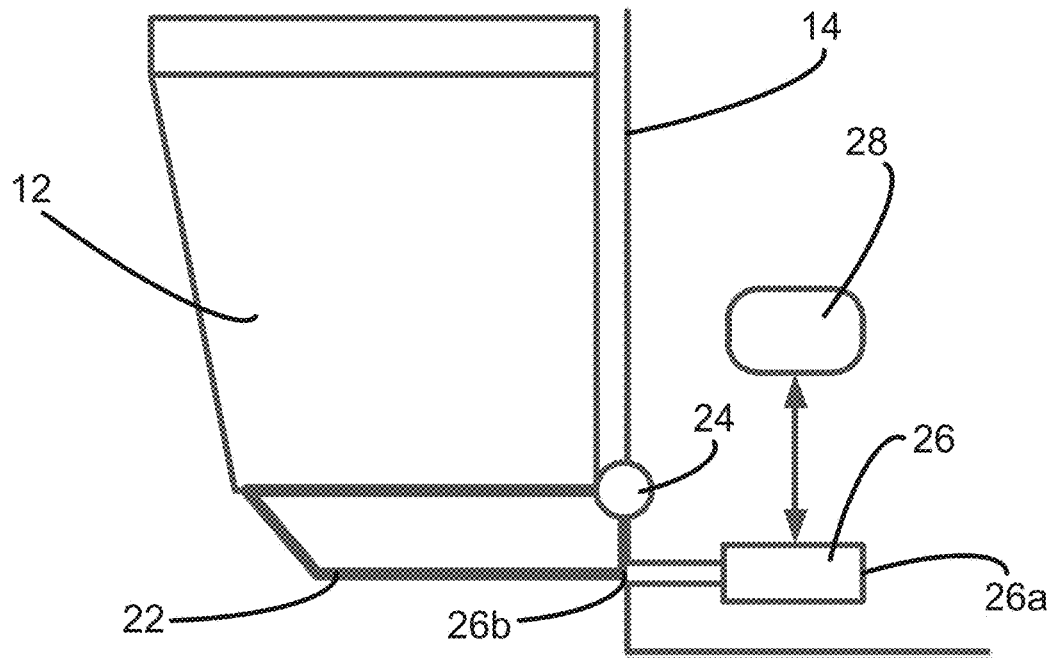
FIG. 2 is an enlarged view of a portion of the agricultural machine of FIG. 1, when the vehicle cab is in an unpivoted position.
Figure 3:
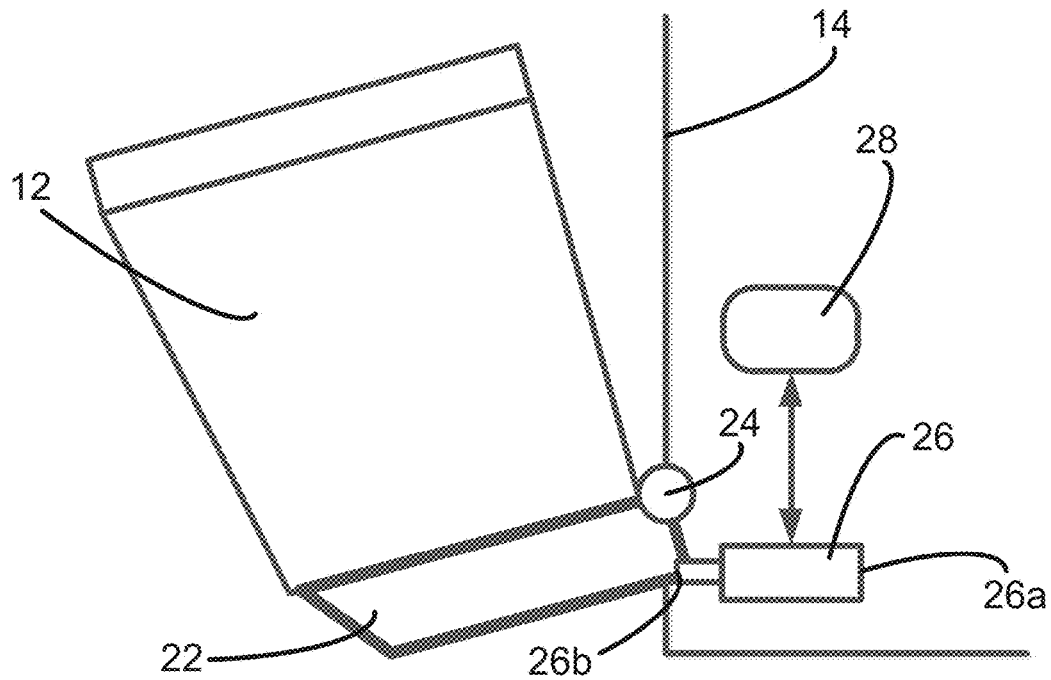
FIG. 3 is an enlarged view of a portion of the agricultural machine of FIG. 1, when the vehicle cab is pivoted.

An enlarged view of the vehicle cab 12 and adjacent main frame 14 is provided in FIGS. 2 and 3. FIG. 2 provides an illustration of a regular operational configuration, wherein the vehicle cab 12 is provided on a support frame 22, arranged at the base of the cab 12. The combine 10 comprises at least one hinge coupling 24, through which the support frame 22 is pivotally mounted to the main frame 14. The hinge coupling 24 is arranged to provide an axis of rotation transverse to the main longitudinal axis of the combine 10.

The combine 10 is provided with at least one actuator 26, preferably a linear actuator. The actuator 26 is mounted to the main frame 14 of the combine 10 at a first end 26a, and it mounted to the support frame 22 of the combine 10 at an opposite second end 26b. The second end 26b of the actuator 26 is connected to the support frame 22 at a point spaced from the hinge coupling 24, such that movement of the actuator 26 acts to control the rotation of the support frame 22 about the axis of rotation of the hinge coupling 24. It will be understood that the actuator 26 may be hingedly mounted to the main frame 14 and support frame 22, and/or the actuator may be provided on a rail system on the main frame 14 to allow for the movement of the actuator 26 relative to the frames 14,22 during pivoting of the support frame 22.

The actuator 26 is preferably provided as a hydraulic cylinder, but it will be understood that other actuators may be provided, e.g. mechanical, electromechanical, pneumatic. In a preferred aspect, an actuator 26 in the form of a hydraulic cylinder is provided with a hydraulic accumulator 28, which is configured to act as a damper system in the event of relatively large vibrations or sudden movements of the combine 10. Accordingly, the accumulator 28 acts to smooth out any such movements, thereby acting as a damping suspension system for the vehicle cab 12.

The operation of the actuator 26 and/or the connection of the actuator 26 with the accumulator 28 is controlled by a controller, preferably provided as part of ECU 20. The ECU 20 adjusts the extension or retraction of the actuator 26, to control the degree of rotation of the support frame 22 and vehicle cab 12 about the axis of rotation of the hinge coupling 24.

With reference to FIG. 3, the hinge coupling 24 allows the support frame 22 and the supported vehicle cab 12 to pivot about the axis of rotation relative to the main frame 14 of the combine 10. As a result, an operator in the vehicle cab 12 can rotate the cab 12 in a downwards direction from the operational position as shown in FIG. 2 to a lowered position as shown in FIG. 3. When in the lowered position, the operator has a clearer view of the front coupling 16 of the combine 10, and accordingly can more accurately control the combine 10 when performing a coupling operation with a work implement. This provides for improved comfort for the operator, and more accurate control of such coupling operations without the need for complicated and expensive camera monitoring systems, or additional external assistance.

The ECU 20 can control the pivoting of the support frame 22 and cab 12 responsive to user commands received via the operator terminal 18. Additionally or alternatively, the ECU 20 can detect when a coupling operation is being performed for the front coupling 16, and will automatically adjust the actuator 26 to lower the support frame 22 and cab 12 to provide an operator with a clear view of the front coupling 16. Similarly, the ECU 20 may control the connection of the accumulator 28 with the actuator 26, to regulate the damping effect of the accumulator 28. Such connection may be responsive to a user command and/or the detection that the combine 10 is in a road mode, and/or driven at a relatively high speed indicative of road transport.

In a preferred configuration, the combine 10 is provided with left- and right-sided hinge couplings 24 provided at respective left- and right-hand sides of the vehicle cab 12. Additionally, the combine 10 is provided with left- and right-sided actuators 26 provided at respective left- and right-hand sides of the vehicle cab 12. The use of such paired elements allows for greater distribution of forces from the support frame 22 to the main frame 14 of the combine 10. In addition, it will be further understood that additional hinge couplings and/or actuators may be used, as appropriate.

The combine 10 may be provided with suitable sensors to detect the presence of obstacle, e.g. distance sensors such as optical sensors, ultrasonic sensors, etc., wherein the pivoting of the support frame 22 and the cab 12 is controlled partly based on the output of such sensors, to prevent the frame 22 or the cab 12 from unintentionally striking such obstacles.

While the above description explains one result of lowering the cab 12 as providing a better view of a front coupling of a combine 10, it will be understood that the lowering of the cab 12 may also be performed in order to provide the operator with a better view of the ground surface immediately in front of the cab 12. This may aid the operator in steering the combine 10 when in a restricted space environment, or in the presence of multiple obstacles. In addition, by lowering the cab 12, an operator can easily inspect the status or performance of a work implement attached to the front coupling 16 from the comfort of the cab 12 itself.

While the invention is illustrated with reference to an embodiment of a combine harvester, it will be understood that other embodiments may be provided wherein a vehicle cab may be pivoted to provide for improved operator visibility of implement couplings, e.g. a windrower, an agricultural tractor, etc.

The invention is not limited to the embodiments described herein, and may be modified or adapted without departing from the scope of the present invention.

The invention claimed is:

1. An agricultural machine, the machine comprising:
   a main frame;
   a front coupling provided on the main frame for releasably attaching a work implement to the agricultural machine; and
   a vehicle cab for housing an operator,
   wherein the vehicle cab is mounted to the main frame via at least one hinge coupling, the hinge coupling having an axis of rotation transverse to the direction of travel of the agricultural machine such that, in use, the vehicle cab is pivotable about the axis of rotation relative to the main frame, to provide an operator with a view of the front coupling and/or a work implement attached thereto;
   a controller arranged to control the pivoting of the vehicle cab about the axis of rotation, wherein the controller is configured to control the pivoting of the vehicle cab in response to the controller detecting an operation is being performed to attach or detach a work implement with the front coupling.

2. The agricultural machine of claim 1, wherein the agricultural machine comprises a combine harvester or forage harvester.

3. The agricultural machine of claim 1, wherein the vehicle cab is mounted to a support frame, wherein the at least one hinge coupling is provided on the support frame.

4. The agricultural machine of claim 1, wherein the agricultural machine comprises at least one actuator arranged to control the pivoting of the vehicle cab about the axis of rotation.

5. The agricultural machine of claim 4, wherein the vehicle cab is mounted to a support frame, wherein the at least one hinge coupling is provided on the support frame, wherein a first end of the at least one actuator is coupled with the main frame, a second end of the at least one actuator coupled with the support frame.

6. The agricultural machine of claim 5, wherein the first end of the actuator is hingedly coupled to the main frame, and the second end of the actuator is hingedly coupled to the support frame, to allow the movement of a first end of the actuator through an arc as the vehicle cab is pivoted.

7. The agricultural machine of claim 4, wherein the at least one actuator comprises a linear actuator, wherein the linear actuator is a hydraulic cylinder.

8. An agricultural machine, the machine comprising:
   a main frame;
   a front coupling provided on the main frame for releasably attaching a work implement to the agricultural machine;
   a vehicle cab for housing an operator, wherein the vehicle cab is mounted to the main frame via at least one hinge coupling, the hinge coupling having an axis of rotation transverse to the direction of travel of the agricultural machine such that, in use, the vehicle cab is pivotable about the axis of rotation relative to the main frame, to provide an operator with a view of the front coupling and/or a work implement attached thereto;
   at least one actuator arranged to control the pivoting of the vehicle cab about the axis of rotation, wherein the at least one actuator comprises a linear actuator, wherein the linear actuator is a hydraulic cylinder; and
   at least one hydraulic accumulator coupled with the at least one hydraulic cylinder, the at least one hydraulic accumulator acting as a damper for the hydraulic cylinder to reduce vibrations of the vehicle cab.

9. The agricultural machine of claim 8, wherein the agricultural machine comprises a controller arranged to selectively couple the at least one hydraulic cylinder with the at least one hydraulic accumulator.

10. The agricultural machine of claim 9, wherein said coupling is responsive to an initiation of a road transport mode of the agricultural machine.

11. The agricultural machine of claim 8, wherein the agricultural machine comprises a controller arranged to control the pivoting of the vehicle cab about the axis of rotation.

12. The agricultural machine of claim 11, wherein the controller is configured to control the pivoting of the vehicle cab in response to a user command to pivot the vehicle cab.

13. The agricultural machine of claim 11, wherein the controller is configured to control the pivoting of the vehicle cab in response to the controller detecting an operation is being performed to attach or detach a work implement with the front coupling.

14. The agricultural machine of claim 1, wherein the agricultural machine is provided with left and right hinge couplings provided at left- and right-hand sides of the vehicle cab.

15. The agricultural machine of claim 1, wherein the agricultural machine is provided with left and right actuators provided at left- and right-hand sides of the vehicle cab, the left and right actuators arranged to control the pivoting of the vehicle cab about the axis of rotation.

16. The agricultural machine of claim 8, wherein the agricultural machine comprises a combine harvester or forage harvester.

17. The agricultural machine of claim 8, wherein the vehicle cab is mounted to a support frame, wherein the at least one hinge coupling is provided on the support frame.

18. The agricultural machine of claim 17, wherein a first end of the actuator is hingedly coupled to the main frame, and a second end of the actuator is hingedly coupled to the support frame, to allow the movement of a first end of the actuator through an arc as the vehicle cab is pivoted.

19. The agricultural machine of claim 8, wherein the agricultural machine is provided with left and right hinge couplings provided at left- and right-hand sides of the vehicle cab.

20. The agricultural machine of claim 8, wherein the agricultural machine is provided with left and right actuators provided at left- and right-hand sides of the vehicle cab, the left and right actuators arranged to control the pivoting of the vehicle cab about the axis of rotation.

* * * * *